Patented July 2, 1946

2,403,153

UNITED STATES PATENT OFFICE 2,403,153

PICKLING INHIBITOR

Albert J. Saukaitis, Wayne, Pa., assignor to American Chemical Paint Company, Ambler, Pa., a corporation of Delaware No Drawing. Application April 6, 1942, Serial No. 437,827

8 Claims. (Cl. 252—149)

This invention relates to the inhibition, i. e., to the lessening or retarding of the rate of attack of acids on metals and is particularly directed to the production of novel compositions for this purpose.

As is well known in the art, pickling and metal cleaning operations frequently involve the use of solutions of dilute non-oxidizing acids such as sulphuric, hydrochloric, phosphoric, acetic, formic, etc., as well as of aqueous solutions of acid salts, such as acid sulphate, and the like. Solutions of this kind are used for numerous purposes, a typical example of which is the pickling of (i. e., the removal of heat scale from) iron or steel articles such as sheets, bars, forgings, wire and other articles at various stages of their manufacture. The composition of these solutions, their temperature of use, and other factors, vary with different operations, but in every instance the primary function of the solution is to remove undesirable encrustations from the metal, and the purpose of the inhibitor is to restrain the attack of the acid upon the exposed metal and thus to conserve acid and to prevent or minimize damage to the article.

The principal object of my invention is the production of an inhibitor of greatly increased inhibiting power as well as one the effect of which in the solution in which it is used is far more lasting than that of any previous inhibitor with which I am familiar. As an incident to this object, my invention also contemplates a marked saving in acid and prevention of damage to the article being treated. It is also an object of my invention to decrease the quantity of inhibitor which it is necessary to employ. All of these objects result in a reduction in costs.

At this point I should like to state that the inhibitors of this invention are adapted for use not only in metal pickling and cleaning operations, but also in numerous other applications, among which may be mentioned the acidizing of oil wells, the protection of steel drums or vessels against corrosion by contained acid solutions, etc.

While the following description will fully set forth the nature of my invention and the manner in which it is used, I should like to state at this time that a quantity of my improved inhibitors as small as five-thousandths of one percent, dissolved or well dispersed in the solution, will markedly reduce the rate of attack of the acid on the sound metal, and as a usual practice I prefer to employ between five thousandths of one percent and one tenth percent, although more or less may be used if desired.

The inhibitors of this invention are the organic reaction products derived from cyclic bases from coal tar by a series of reactions with certain reactive organic chlorides on the one hand, and with a substance chosen from the class consisting of inorganic thiocyanates and thiourea, on the other hand.

The bases which I have found suitable for the preparation of my improved inhibitors exist in coal tar. Isolated bases may be employed, or narrow cuts of bases extracted from coal tar, or the entire extracted bases from various fractions of coal tar. For example, I may use as a starting material the chemical individuals pyridine, any of the individual lutidines, picolines or collidines, quinoline, substituted quinolines, etc. Or I may employ commercial cuts known as crude pyridine bases, crude quinoline fraction, a crude quinoline fraction from which the quinoline itself has been removed, etc. Apparently bases extracted by the usual commercial methods from any fraction of coal tar are satisfactory, even when certain individuals have been removed from the fraction. The bases themselves may boil over a wide range as, for example, from 110° C. to 365° C. or even higher. Some of these bases are known to be of the pyridine and quinoline series; others contain hydrogenated rings. In any case, all the coal tar bases of commerce seem to be suitable as raw materials for the manufacture of my improved inhibitors.

Among the organic chlorides which I have found useful in the production of the improved inhibitors of this invention are ethylene dichloride, propylene dichloride, dichloroethyl ether, dichloroisopropyl ether, triglycol dichloride, tetraglycol dichloride, benzyl chloride, and naphthyl methyl chloride.

The third class of reactants which I employ in manufacturing my improved inhibitors consists of inorganic thiocyanates and thiourea. If a thiocyanate is chosen for the reaction, I prefer to use a water soluble thiocyanate, such as the thiocyanate of ammonium, of an alkali metal, or of an alkaline earth metal. Such water soluble thiocyanates are readily reactive and may be added to the reaction mass in the form of water solutions of such strength that their specific gravity corresponds to that of the reaction mass. Thorough mixing during the reaction is thus facilitated.

The manufacture of my preferred inhibitors may follow one of several procedures:

One method of manufacture consists in first reacting a base or mixture of bases of the kind described with a reactive organic chloride of the class mentioned, as by heating the reactants together until the reaction is ended. In many cases the product of this reaction is water soluble, or substantially so, and the end of this first step may be judged by the reaction mixture's having become water soluble.

After the reaction of the bases with the chloride, just described, the reaction product is treated with a thiocyanate or with thiourea, which may be added as the dry salt or together with a convenient amount of water. After the mixture has been heated for a time, the reaction is ended.

If a thiocyanate was used in the second step the reaction product, which is substantially water-insoluble, may be freed of metallic or ammonium chloride which is formed in the reaction by washing with water. The reaction mass may now be dissolved by the aid of alcohol, isopropyl alcohol, or other water soluble solvent, and to it may also be added sulfuric acid or hydrochloric acid to increase its solubility and stability.

In such form it is conveniently added to an aqueous acid solution for use. Although not entirely soluble in the acid solution, it disperses readily and produces a powerful inhibiting effect even though present in very minute quantity.

It is well known that to produce maximum effectiveness an inhibitor should be finely dispersed throughout the acid solution in which it is used. Of course, the finest type of dispersion is true solution which is generally desirable if it can be accomplished. However, fine mechanical dispersion is sufficient with my improved inhibitors to secure great inhibiting power.

If thiourea is used in the second step, this compound is added to the reaction mass from the bases and the organic chloride in dry form or together with water. The mixture is heated for a time when it becomes homogeneous and the product remains water soluble. If the water is completely evaporated the product becomes a fusible resin, which solidifies on cooling and may be ground to a powder either alone or admixed with salt, wetting agent, etc., as desired. Because of the small amounts of this inhibitor which are generally used in inhibiting acid solutions, it is generally desirable to supply it for use in solution in water or diluted in a powder with salt, anhydrous sodium sulphate or other inert water soluble diluent. Wetting agents such as hydrocarbon sulfonates, sulfated alcohols, etc., may be added to the admixture to assist its wetting by the acid solution and to prevent its floating on the surface.

Another method of manufacture of my preferred inhibitors consists in first reacting together the organic chloride with the thiocyanate or the thiourea, in the presence or absence of a mutual solvent by heating for some time. The product of that reaction is then treated with coal tar base or bases of the kind described and further heated.

The resultant product is treated as is the final product from the method of manufacture first described.

Still another method of manufacture consists in reacting together all three types of reactants in one step; namely, the bases, the chloride, and the thiocyanate and/or the thiourea. Variations in procedure incident to different methods of manufacture will be obvious to the chemist.

It must be remarked that, in general, the inhibitors produced by the reaction of organic chloride, thiocyanate, and base, are identical, independent of which of the three methods of manufacture is used, although there may be exceptions. In the case of the reaction of organic chloride, base, and thiourea different products are generally obtained depending upon the order in which the reactants are added. However, in all cases the products obtained are useful, powerful inhibitors, although their strengths may differ somewhat, for a given choice of reactants, with the order in which the successive reactions are carried out.

The quantities of reactants used, whichever method of manufacture is selected, should be so chosen that for each gram atom of reactive chlorine in the amount of organic chloride used, an amount of coal tar base should be taken, which contains about one gram atom of basic nitrogen; and an amount of thiocyanate should be taken which contains about one gram equivalent of the thiocyanate group (CNS). If, instead of a thiocyanate, thiourea is used, about one gram molecule of thiourea should be taken. If both a thiourea and a thiocyanate are used the aggregate number of gram equivalents of CNS and gram molecules of thiourea taken should be unity.

The reaction appears to go quantitatively in the stoichiometric ratio of

1 Cl:1 basic nitrogen:1 ($CNS + CS(NH_2)_2$)

The term in parentheses indicates the sum of the number of CNS groups and $CS(NH_2)_2$ (thiourea) molecules.

Some departure from the indicated stoichiometric ratio is permissible without harm. Generally speaking an excess of either coal tar bases or of a thiocyanate or of thiourea is frequently not deleterious to the finished inhibitor. An excess of organic chloride is also frequently harmless, except that it may impair somewhat the solubility of the inhibitor in the acid bath in which it is to be employed. In any case undesired excess of any ingredient can be removed, if desired, by methods apparent to the chemist.

I will now give some specific examples of the ways in which my improved inhibitors can be prepared and of the manner in which they may be employed.

EXAMPLE I

An inhibitor was prepared as follows:

Step No. 1

Parts
Coal tar "pyridine bases" boiling range 140° C. to 360° C_____ 258
Dichloroethyl ether_____ 143

The above reactants were heated together at a temperature of 105° C. for 36 hours. In another preparation the mixture was heated at 150° C. for 15 hours. Other times and temperatures have likewise proven satisfactory.

In each case heating was continued with stirring until a cooled sample of the reaction product had a consistency ranging from a thick sticky paste to an almost brittle mass.

Step No. 2

To the above reaction product was added

Ammonium thiocyanate_____ 152 parts

In some preparations the ammonium thiocyanate was added in crystalline form; in others as a water solution of about 50% strength. The reaction mixture was now further heated and stirred for about one hour at 100° to 120° C.

Water was then added to dissolve ammonium chloride produced in the reaction and to wash the product. On allowing to stand the product sank to the bottom and the aqueous layer was discarded. The product may be further washed with water if desired, and for commercial use it can be brought into solution as follows:

|  | Parts |
|---|---|
| Reaction product | 400 |
| Denatured alcohol | 340 |
| 66° Bé. sulfuric acid | 165 |
| Water | 95 |
| Total | 1,000 |

As so prepared for commercial use, the liquid is a very powerful inhibitor which disperses well in acid solutions such as are generally used for cleaning, pickling, etc.

EXAMPLE II

*Step No. 1*

This step was carried out exactly as under Example I, above.

*Step No. 2*

To the reaction product of Step No. 1 were added:

Thiourea _____ 152 parts

In some preparations the thiourea was added as solid crystals; in others as a slurry with an equal weight of water. After heating at 120 to 145° C. for about 1 hour (or until substantially dehydrated) the fusible resinous mass was poured into a pan to cool. It was substantially completely water soluble.

In order to prepare the inhibitor of this example for commercial use, I proceed as follows:

|  | Parts |
|---|---|
| Reaction product | 30 |
| Common salt | 69 |
| Sodium isopropyl naphthalene sulfonate | 1 |
| Total | 100 |

The above mixture is ground together in a mill until of suitable fineness and the powder is a very powerful inhibitor.

The sodium isopropyl naphthalene sulfonate is added as a wetting agent to assist in dispersing the powder rapidly in the pickling bath. Other wetting agents have been used with equal satisfaction.

EXAMPLE III

*Step No. 1*

|  | Parts |
|---|---|
| Crude "quinoline base" extract of coal tar | 258 |
| Triglycol dichloride | 187 |

The "quinoline base" extract above had been distilled to remove the quinoline itself.

This step was carried out by heating and stirring under the same conditions as obtained under Example I, Step No. 1.

*Step No. 2*

To the above reaction product was added:

Sodium thiocyanate _____ 162 parts

An equal weight of water was added along with the sodium thiocyanate, and the mixture was heated and stirred at 100 to 120° C. for about one hour.

More water was then added to dissolve the sodium chloride, the product was allowed to settle, and the watery layer drawn off to waste.

The product, which amounted to 445 parts, was a pasty oil, insoluble in water, which was dissolved in a suitable solvent for use, in a manner similar to that which is employed in connection with Example I.

Other examples of reactants used are given in the following:

EXAMPLE IV

*Step No. 1*

|  | Parts |
|---|---|
| Dichloroethylether | 143 |
| Ammonium thiocyanate | 152 |

To the above admixture was added about an equal volume of alcohol and the whole gradually heated up to a temperature of 100° C. until the alcohol had distilled out of the mixture. Water was then added to dissolve the precipitated ammonium chloride and the heavy oily reaction product drawn off from under the water. The yield of this step was over 180 parts of product.

*Step No. 2*

The product of the above step was reacted with 158 parts of pyridine by heating at about 160° C. for eight hours. At this time the material was pasty on cooling, and was completely water-soluble. The yield was approximately 340 parts.

A satisfactory commercial inhibitor solution can be made by dissolving this product in water to a final concentration of approximately 30%. Alcohol may be incorporated to improve the solubility and lower the freezing point.

The above examples are given merely as illustrative of the methods of carrying out the manufacture of my preferred inhibitors, and not as limiting the scope of my invention.

Insofar as their inhibiting properties are concerned, the improved inhibitors of this invention are usable as prepared in concentrated form, namely, as they are obtained by the described reactions. However, for commercial use it is often desirable that they be made somewhat diluted and in a form easily dispersible in the acid solutions in which they might be employed. To this end, in the production of a diluted commercial liquid inhibitor, I prefer to dissolve the concentrated materials in appropriate solvents so chosen that when the solution is added to the acid solutions for use it disperses readily. It is often important, in order to obtain this result, to add "weighting" materials which are compatible with the other ingredients. In Example I above, for instance, the solution as prepared for commercial use contains 165 parts of 66° Bé. sulphuric acid. This sulphuric acid not only aids in keeping the reaction product of Example I in solution but also in raising the specific gravity of the solution to approximately 1.1, which is heavier than and consequently readily sinks in the acid solutions in which the product would commonly be employed. Other weighting substances which have been successfully used are 75% phosphoric acid and certain compatible metal salts which serve merely to increase the specific gravity but are otherwise inert in the composition.

It is equally important that when my improved inhibitors are to be employed in the form of solid powders that they disperse easily in the acid solution. It has already been pointed out in connection with Example II that a wetting or dispersing agent is useful in this connection.

The temperatures employed in preparing my improved inhibitors are preferably above the boiling point of water and not greater than about 180° C., although the specific temperature for any particular method of procedure is not extremely vital. Naturally lower temperatures generally involve longer periods of treatment than do higher temperatures in accordance with well known chemical laws. As a guide it can be said that a temperature should be employed which will result in thorough reaction between the materials employed, and in following this guide the upper limit, of course, will be pretty much determined by the boiling point of the mass undergoing treatment. Charring or injurious excess of temperature is readily perceivable by those skilled in the art.

I realize, of course, that certain coal tar bases, some thiocyanates, and certain thioureas as well even as certain thiocyanates of coal tar bases have heretofore been used as inhibitors. While such materials have merit, my improved products, even though starting with the same coal tar bases or thiocyanates, are far more effective. Not only do my improved products have great initial or instantaneous control effectiveness, but their "lasting power" in a pickle bath which is used hour after hour to pickle successive batches of steel, is far superior to that of any other inhibitor known to me. This "lasting power" seems to be dependent on the resistance of the inhibitor to decomposition by the hot acid solutions usually employed and to the destructive effect of the metal-acid combination and the nascent hydrogen evolved. It seems also to be connected with a lower quantitative removal by adsorption on the metal surfaces of the work. Whatever the reasons, my improved inhibitors exhibit great "lasting power" and thus impart exceptionally long life to a pickle bath before it accumulates so much dissolved metal that it needs to be discarded.

While it is possible to speculate from their observed properties upon the chemical constitution of my novel inhibitors, I do not care to be limited by any theory as to their constitution.

I claim:

1. As a material for inhibiting the attack of acid solutions on metal surfaces, the organic reaction product formed by heating to effect chemical interaction among the following materials; an organic chloride chosen from the group consisting of ethylene dichloride, propylene dichloride, dichloroethyl ether, dichloroisopropyl ether, triglycol dichloride, tetraglycol dichloride, benzyl chloride, and naphthyl methyl chloride; a cyclic coal tar base; and a substance chosen from the group consisting of water-soluble inorganic thiocyanates and thiourea; the proportions of the said reactants being chosen so that approximately one gram atom of basic nitrogen is added in the form of the said coal tar base, and approximately one gram equivalent, in the aggregate, of the groups thiocyanate (CNS) and thiourea (SC(NH$_2$)$_2$) is added in the form of a substance chosen from said group of water-soluble inorganic thiocyanates and thiourea, for each gram atom of chlorine added, in the form of the said organic chloride.

2. As a material for inhibiting the attack of acid solutions on metal surfaces, the organic reaction product formed by heating together an organic chloride chosen from the group consisting of ethylene dichloride, propylene dichloride, dichloroethyl ether, dichloroisopropyl ether, triglycol dichloride, tetraglycol dichloride, benzyl chloride, and naphthyl methyl chloride; a cyclic coal tar base; and a substance chosen from the group consisting of water-soluble inorganic thiocyanates and thiourea; the proportions of the said reactants being chosen so that approximately one gram atom of basic nitrogen is added in the form of the said coal tar base, and approximately one gram equivalent, in the aggregate, of the groups thiocyanate (CNS) and thiourea (SC(NH$_2$)$_2$) is added in the form of a substance chosen from said group of water-soluble inorganic thiocyanates and thiourea, for each gram atom of chlorine added, in the form of the said organic chloride.

3. In a process of making an inhibitor of acid attack on metals the step which comprises heating together at a temperature not exceeding about 180° C. to cause chemical reaction, an admixture comprising an organic chloride chosen from the group consisting of ethylene dichloride, propylene dichloride, dichloroethyl ether, dichloroisopropyl ether, triglycol dichloride, tetraglycol dichloride, benzyl chloride, and naphthyl methyl chloride; a cyclic coal tar base; and a substance chosen from the group consisting of water-soluble inorganic thiocyanates and thiourea; the proportions of the said reactants being chosen so that approximately one gram atom of basic nitrogen is added in the form of the said coal tar base, and approximately one gram equivalent, in the aggregate, of the groups thiocyanate (CNS) and thiourea (SC(NH$_2$)$_2$) is added in the form of a substance chosen from said group of water-soluble inorganic thiocyanates and thiourea, for each gram atom of chlorine added, in the form of the said organic chloride.

4. A process of making an inhibitor of acid attack on metals which comprises reacting at a temperature not exceeding about 180° C. an organic chloride from the group consisting of ethylene dichloride, propylene dichloride, dichloroethyl ether, dichloroisopropyl ether, triglycol dichloride, tetraglycol dichloride, benzyl chloride, and naphthyl methyl chloride; a cyclic coal tar base; and a substance chosen from the group consisting of water-soluble inorganic thiocyanates and thiourea; said reaction being effected in a series of steps wherein the first step consists in heating together to cause chemical reaction the said organic chloride with one of the other two reactants; and the second step consists in heating together to cause reaction the product of the said first step and the remaining reactant; the proportions of the said reactants being chosen so that approximately one gram atom of basic nitrogen is added in the form of the said coal tar base, and approximately one gram equivalent, in the aggregate, of the groups thiocyanate (CNS) and thiourea (SC(NH$_2$)$_2$) is added in the form of a substance chosen from said group of water-soluble inorganic thiocyanates and thiourea, for each gram atom of chlorine added, in the form of the said organic chloride.

5. In a process of making an inhibitor of acid attack on metals the steps which comprise heating at a temperature not exceeding about 180° C. to cause reaction, an organic chloride chosen from the group consisting of ethylene dichloride, propylene dichloride, dichloroethyl ether, dichloroisopropyl ether, triglycol dichloride, tetraglycol dichloride, benzyl chloride, and naphthyl methyl chloride and a cyclic coal tar base, and heating together the product of the said reaction with a substance chosen from the group consisting of water-soluble inorganic thiocyanates and thiourea; the proportions of the said reactants being chosen so that approximately one gram atom of basic nitrogen is added in the form of the said coal tar base, and approximately one gram equivalent, in the aggregate, of the groups thiocyanate (CNS) and thiourea (SC(NH$_2$)$_2$) is added in the form of a substance chosen from said group of water-soluble inorganic thiocyanates and thiourea, for each gram atom of chlorine added, in the form of the said organic chloride.

6. A dilute, non-oxidizing acid cleaning and pickling bath for ferrous metals in which is dispersed a small amount of the material of claim 1.

7. A dilute, non-oxidizing acid cleaning and pickling bath for ferrous metals containing a small amount of an inhibitor produced by chemical reaction among dichloroethyl ether, a cyclic coal tar base and ammonium thiocyanate in substantially stoichiometric quantities with respect to the chlorine of the dichloroethyl ether, the basic nitrogen of the coal tar base, and the thiocyanate group of the ammonium thiocyanate.

8. A dilute, non-oxidizing acid cleaning and pickling bath for ferrous metals containing a small amount of an inhibitor produced by chemical reaction among dichloroethyl ether, a cyclic coal tar base, and thiourea, in substantially stoichiometric quantities with respect to the chlorine of the dichloroethyl ether, the basic nitrogen of the coal tar base, and the thiourea molecule.

ALBERT J. SAUKAITIS.